United States Patent [19]

Cremer

[11] 4,026,266

[45] May 31, 1977

[54] PORTABLE BARBECUE

[75] Inventor: Robert L. Cremer, Neosho, Mo.

[73] Assignee: Neosho Products Company, Neosho, Mo.

[22] Filed: June 1, 1976

[21] Appl. No.: 691,754

[52] U.S. Cl. .......................... 126/25 A; 99/421 HV; 126/9 R; 126/9 B; 126/304 R; 126/306; 248/151

[51] Int. Cl.² ....................... F24B 3/00; F24C 1/16; F24C 15/08

[58] Field of Search ................ 126/9 R, 9 B, 25 R, 126/25 A, 304 R, 305, 306; 99/421 HV; 248/151, 523, 519, 220.2, 431, 164, 432; 220/69; D7/107, 110

[56] References Cited

UNITED STATES PATENTS

| | | | |
|---|---|---|---|
| 1,467,815 | 9/1923 | Roemer | 126/304 R |
| 1,540,434 | 6/1925 | Stone | 126/25 A |
| 2,841,352 | 7/1958 | Pappas | 248/431 |
| 2,959,165 | 11/1960 | Mark | 126/9 R |
| 3,286,705 | 11/1966 | Bedol | 126/25 A |
| 3,452,736 | 7/1969 | Harff et al. | 126/25 R |
| D191,291 | 9/1961 | Miller | 126/25 R |

*Primary Examiner*—William F. O'Dea
*Assistant Examiner*—Harold Joyce
*Attorney, Agent, or Firm*—George R. Clark; Neil M. Rose; John S. Pacocha

[57] ABSTRACT

A portable barbecue having brackets for adjustably supporting the barbecue grid removably attached to the barbecue bowl solely by interengagement between the bowl and the brackets without any additional fastening or mounting members. Each of the brackets is insertable through a horizontal slot in the vertical upwardly extending sides of the barbecue bowl. The brackets are formed so as to provide biasing means which urge an upper notched portion of the bracket into vertical alignment with the sides of the bowl and the other end of the bracket into engagement with the bottom of the barbecue bowl. In one embodiment the other end of the bracket is extended so as to form short legs which are integral with the grid supporting bracket for maintaining the barbecue a short distance above the ground or other supporting surface such as a picnic table. Another embodiment has a separate tripod leg assembly for supporting the barbecue bowl above the ground at approximately the user's waist level.

9 Claims, 10 Drawing Figures

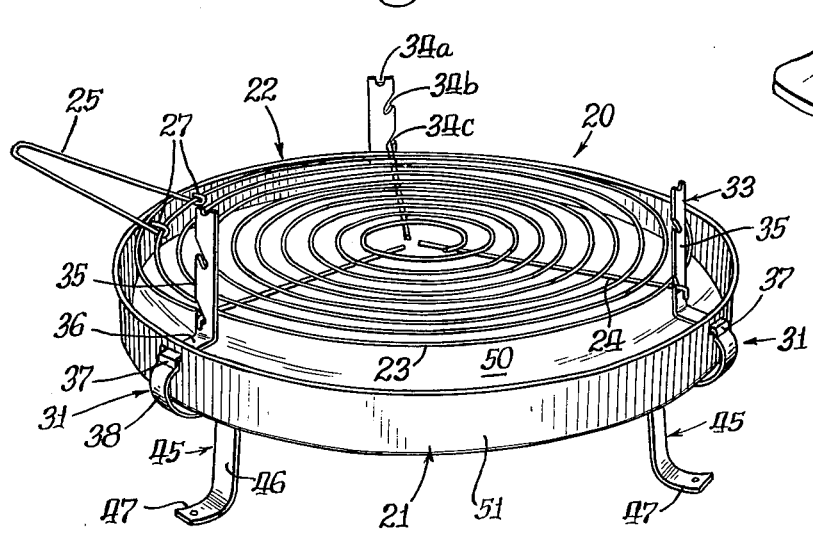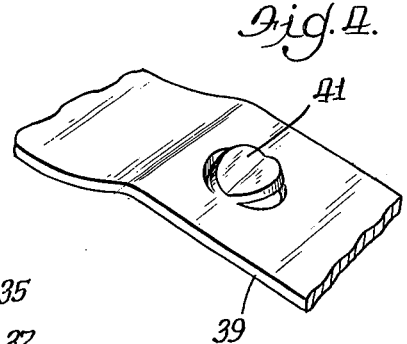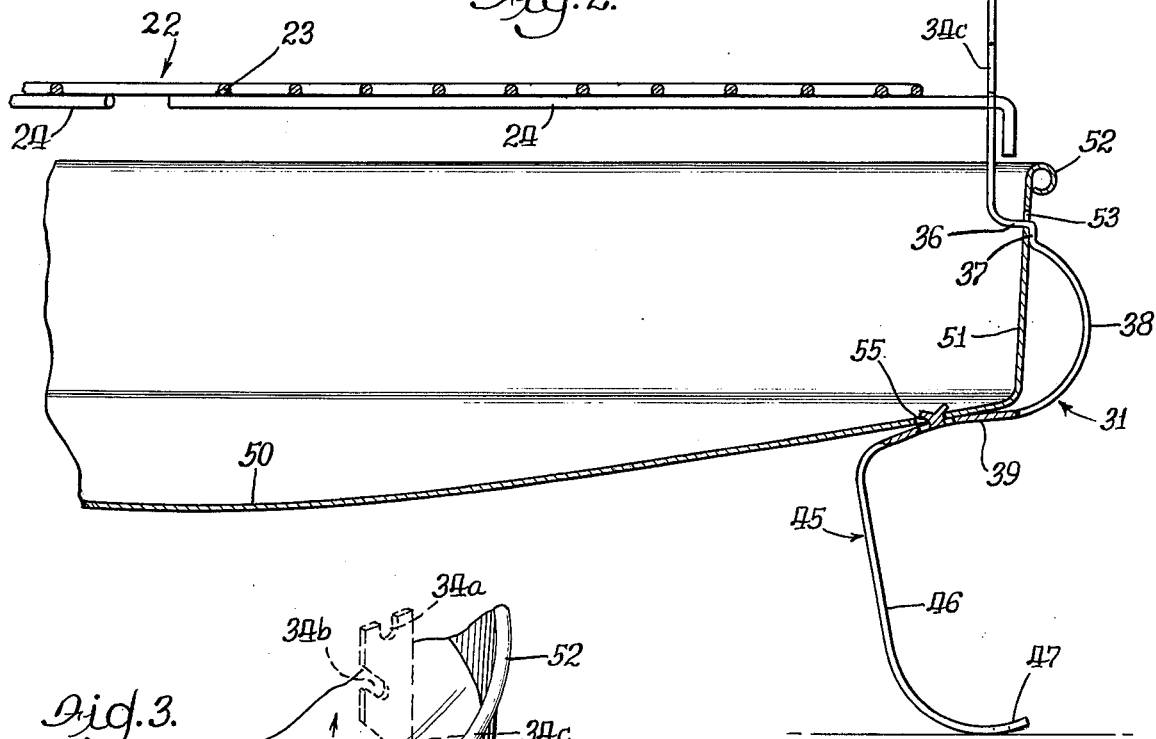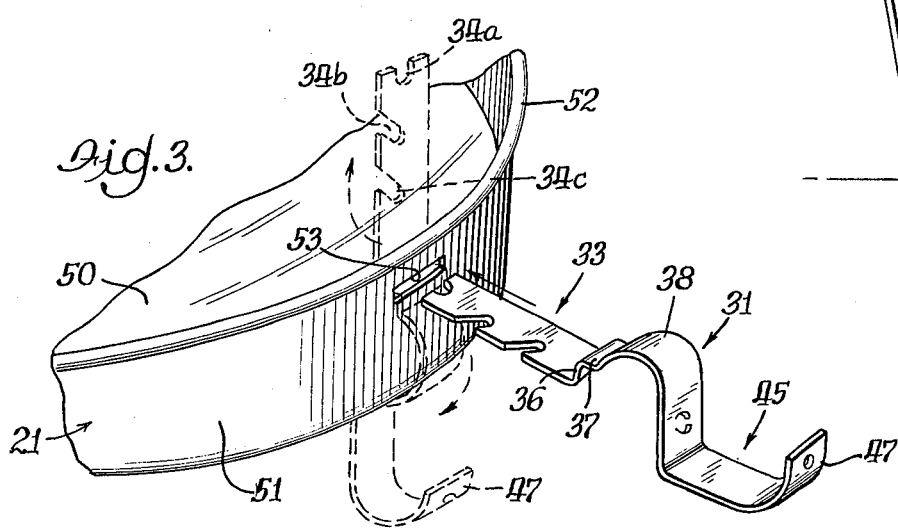

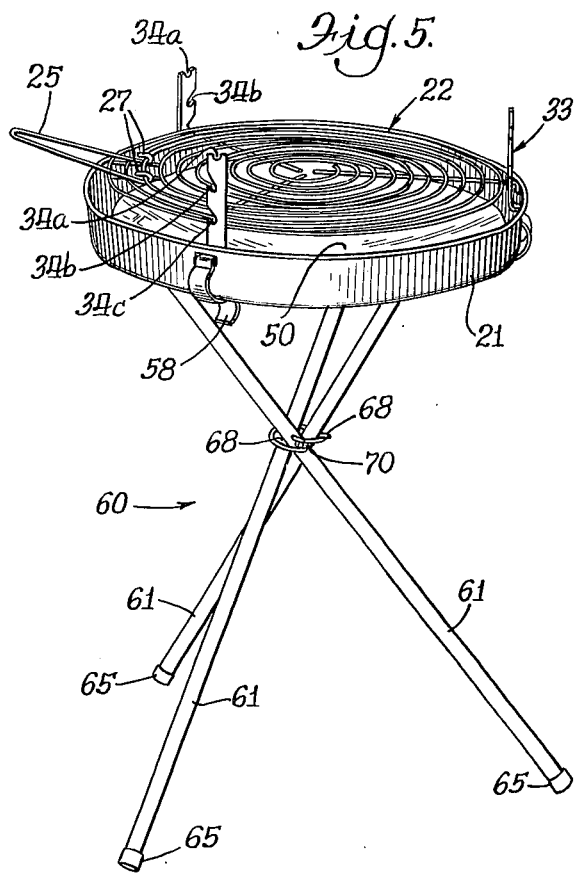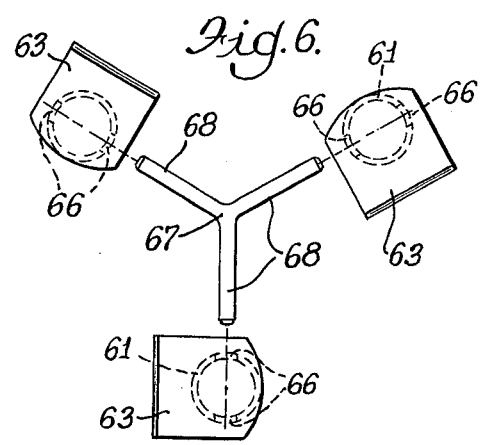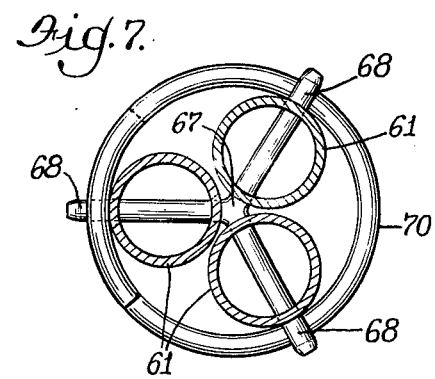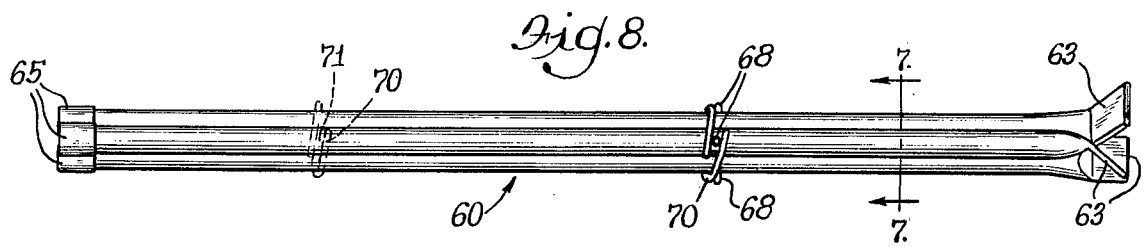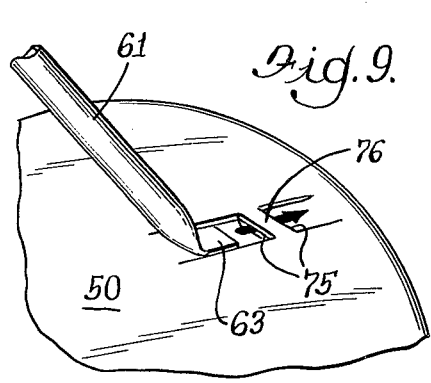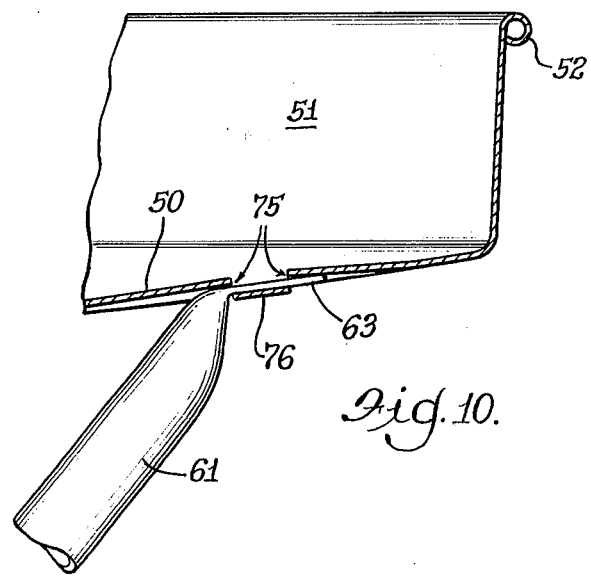

PORTABLE BARBECUE

BACKGROUND OF THE INVENTION

Portable barbecue grills have long been popular for camping and picnicing. Such portable barbecues are different from the barbecues used for backyard or patio cooking in that they must be light weight and easy to assemble and disassemble. Additionally, such portable barbecues must be inexpensive. While willing to make a substantial investment for a unit that will be used at home, the consumer is reluctant to expend large amounts of money for a portable unit to be used at the camp grounds or picnic areas. Many portable barbecues require tools for assembly and disassembly but the requisite tools are not always available at a picnic or camping site. Furthermore, the use of nuts and bolts, screws or other removable fasteners to assemble portable barbecue grills as has been used in the prior art presents problems. In addition to the rather bothersome aspect of having to assemble a portable barbecue by means of such fasteners, it is quite likely that one of such necessary fasteners may become lost while picnicing or camping.

Bedol U.S. Pat. No. 3,286,705 does show a portable barbecue which may be assembled by the consumer without the use of any tools or removable fasteners. However, the Bedol barbecue does have a number of rivets or weldments which must increase the cost of manufacture and can detrimentally affect the ease of assembly and disassembly. On the Bedol barbecue there are clips which are shown to be riveted to the bottom of the barbecue bowl for retaining the legs. The grid supporting brackets are secured to the sides of the bowl by means of keyed slots in the brackets cooperating with studs which are either riveted to or welded to the inside of the bowl. In addition to the inherent cost disadvantages of a structure such as the Bedol barbecue, the rivet assemblies, particularly the bracket supporting studs, present problems to the user. Use of a barbecue results in considerable deposits of grease and carbonizatious material. When such materials are deposited about a keyed slot and stud structure as is used in the Bedol barbecue, they can make disassembly or reassembly of the components extremely difficult.

SUMMARY OF THE INVENTION

The present invention involves a portable barbecue wherein brackets for adjustably supporting the barbecue grid are removably attached to the barbecue bowl solely by interengagement between the bowl and the brackets without any additional fastening or mounting members. Brackets having an upper notched portion for supporting the grill at one of a number of selectable heights are formed of an elongated resilient strip of metal. A top notch is adjacent one end of the strip and at least one additional notch is formed in an edge of the strip below the top notch. Each of the brackets is insertable through a horizontal slot in the vertical upwardly extending sides of the barbecue bowl. The brackets are formed so as to provide biasing means which urge the notched portion of the bracket into vertical alignment with the sides of the bowl and the other end of the bracket into engagement with the bottom of the barbecue bowl.

In one embodiment the other end of the bracket is extended so as to form short legs which are integral with the grid supporting bracket for maintaining the barbecue a short distance above the ground or other supporting surface such as a picnic table. Another embodiment has a separate tripod leg assembly for supporting the barbecue bowl above the ground at approximately the user's waist level.

Accordingly, it is an object of the present invention to provide a portable barbecue which is inexpensive to manufacture.

It is a further object of the present invention to provide a portable barbecue wherein the user may assemble and disassemble the various components without the need of any tools or separate fasteners.

It is an additional object of the present invention to provide a portable barbecue wherein brackets for adjustably supporting the grid with respect to the bowl may be removably attached to the bowl solely by the interengagement between the brackets and the bowl without the need for any additional securing members.

It is yet another object of the present invention to provide legs for the barbecue which are integral with the grid supporting brackets.

Further objects and advantages of the present invention will become apparent as the following description proceeds, and the features of novelty which characterize the invention will be particularly pointed out in the claims annexed to and forming a part of the specification.

BRIEF DESCRIPTION OF THE DRAWINGS

For a better understanding of the present invention, reference may be had to the accompanying drawings in which:

FIG. 1 is a perspective view of a barbecue embodying the invention;

FIG. 2 is an enlarged fragmentary view of the barbecue of FIG. 1, a vertical section having been taken through the bowl, grid, and part of the bracket;

FIG. 3 is an enlarged fragmentary view of the barbecue shown in FIG. 1 showing the integral bracket and leg being attached to the bowl;

FIG. 4 is an enlarged fragmentary view of the integral bracket and leg showing the punched out projection;

FIG. 5 is a perspective view of an alternative embodiment from that shown in FIGS. 1 through 4;

FIG. 6 is an exploded view of a portion of the tripod leg assembly;

FIG. 7 is a sectional view of a portion of the tripod leg assembly taken substantially along the line 7—7 of FIG. 8;

FIG. 8 is an elevational view of the tripod leg assembly;

FIG. 9 is a fragmentary view of the barbecue of FIG. 5 showing one of the legs being attached to the bottom of the bowl; and FIG. 10 is an enlarged fragmentary view of the barbecue of FIG. 5, a vertical section having been taken through the bowl.

DESCRIPTION OF THE PREFERRED EMBODIMENT

Referring now to the drawings in which like parts are designated with like reference numerals in the various views, there is shown in FIG. 1 a portable barbecue generally designated by the reference numeral 20. The barbecue includes a round bowl 21 and grid 22. Other shapes could, of course, be used for the bowl and grid. A spiral wound wire 23 having spot welded radial strengthening members 24 forms the basic grid. A U- shaped or looped wire handle 25 is pivotally secured to the grid by turning over a short portion of each of the ends of the handle in order to form closed loops 27 in a conventional manner.

In the embodiment shown in FIGS. 1 through 4 there are three integral grid supporting bracket and leg members 31. Each of the integral members 31 is formed from a resilient strip of metal by punching and bending operations. Although the embodiment disclosed herein has only three members 31, additional such members could be provided if desired. However, for a round bowl and grid, three integral bracket and leg members are sufficient to adequately support the grid and the bowl.

The bracket part 33 of the integral member 31 is provided with three notches 34 for selectively positioning the grid at various heights with respect to the bowl. Of course, a greater or lesser number of such notches could be provided. However, it has been found that three different heights are sufficient for normal use of a portable barbecue such as that shown in FIG. 1. The uppermost notch 34a is formed in the top end of the bracket 33 while two lower notches 34b and 34c are formed in one edge of the bracket. On a round barbecue such as that shown in FIG. 1 each of the brackets 33 is spaced at 120° from the other two. As will be noted in FIG. 1, the radial strengthening members 24 of the grid are also spaced at 120° with respect to each other. In addition to strengthening the spiral formed wire 23 the radial members 24 are insertable into the notches 34 on the brackets to support the grid at the selected height.

As is best shown in FIGS. 2 and 3 the bracket part 33 of the integral member 31 wherein the notches 34 are formed comprises a substantially straight upwardly extending portion 35. Immediately below the notched portion 35 there is an outwardly curved projection forming a ledge portion 36 which terminates in a downward substantially right angle bend that forms a short substantially vertical abutting portion 37. Following the two bends forming the portions 36 and 37 there is a relatively large radius approximately 180° curved portion 38. At the end of the curved portion 38 the strip extends substantially horizontally to form a clip portion 39. As is best shown in FIG. 4, a projection 41 is formed in the horizontal clip portion 39 by stamping or punching. The leg portion 45 of the integral member 31 is formed by a downward slightly outwardly angled portion 46 and a curved foot 47.

Bowl 21 has a bottom 50 and a substantially vertical upwardly extending side wall 51. At the top of the side wall 51 a rolled rim 52 is formed so as to avoid any sharp dangerous edges. Three horizontal slots 53 are formed in the wall 51. The slots are spaced equally about the periphery of the bowl which in the embodiment shown in FIG. 1 results in their being spaced at 120° with respect to each other. Each of the slots 51 is somewhat wider than the width of the strip forming the bracket part 33 of the member 31. A number of detents 55, corresponding to the number of slots 53, are formed in the bottom 50. Each detent 55 is radially aligned with approximately the horizontal center of a corresponding one of the slots 53.

FIG. 3 illustrates the manner in which the integral bracket and leg member 31 is removably attached to the bowl 21. The notched end of the bracket part 33 is inserted through the horizontal slot 53 from the outside of the bowl. The slot is about twice as high as the thickness bracket part 33 of the member 31 to facilitate insertion of the bracket through the slot. When the ledge portion 36 contacts the side 51 or the rim 52, the user exerts a downward force on the lower end portion of the bracket part 33 of the member 31 to cause the bracket to continue passing through the slot. The downward pressure also forces the clip portion 39 into engagement with the bottom 50 of the bowl 21. The diameter of the curve 38 is less than the distance between the slots 53 and the bottom 50 so that a biasing force is exerted by the curved portion formed from the resilient metal strip. The short vertical portion 37 abuts the outside of the side wall 51 and acts as a stop while the ledge portion 36 rests on the lower horizontal edge of the slot 53. In addition to maintaining the clip portion 39 in engagement with the bottom 50, the biasing force urges the vertical portion 37 into engagement with the side wall 51 and maintains the notched portion of the bracket 33 in substantially vertical alignment. Even if an outward force was exerted on the notched end of the bracket 33 thereby displacing the vertical portion 37 from the side 51, the bracket would remain attached as the lower portion of the straight notched portion 35 would then be forced into engagement with the inside of the wall 51.

While the biasing force exerted by the bracket might be sufficient to maintain the clip portion 39 in engagement with the bottom 50, a projection and detent are provided to insure that the bracket 33 remains attached to the bowl 21. As was mentioned above, a projection 41 is formed in the clip portion 39 and there is a corresponding detent or hole 55 formed in the bowl bottom 50. Once the projection 41 is inserted into the detent 55 the biasing force resulting from the curved portion 38 insures that the integral member 31 will not be inadvertently detached from the bowl 21. In order to remove the member 31 it is necessary to exert an upward and outward force on the end of the clip portion 39. Alternatively, the user may apply the force at the end of the leg portion 45. By applying the force to the foot 47, removal of member 31 is facilitated because the leg portion 45 acts as a lever arm increasing the resulting force on the end of clip portion 39.

As is evident from the drawings and the foregoing description the barbecue of the present invention may be easily assembled and disassembled by the user without the need of any tools or fasteners. Additionally, because of the manner in which the integral bracket and leg member 31 is attachable to the barbecue bowl 21 without the need of any additional fastening elements, the barbecue is economical to manufacture. Furthermore, deposits of grease and carbonizatious materials resulting from the use of the barbecue will not detrimentally affect attachment or removal of the member 31. Any such deposits falling upon the detent 41 and the projection 55 will not preclude the insertion or the removal of the projection from the detent because such insertion or removal is inherently self-cleaning. Similarly, insertion or removal of the bracket part 33 will dislodge any deposits that may have accumulated in slot 53. Because of the direction of the forces involved in inserting or removing either the projection 41 or the bracket part of the member 31 no appreciable additional force is necessary to dislodge the deposits.

The alternative embodiment shown in FIGS. 5 through 10 differs from the embodiment previously discussed in that it is provided with a separate leg assembly 60 rather than having an integral leg and bracket member 31. In the alternative embodiment the brackets 33 for supporting the grid at selectively adjustable heights with respect to the bowl 21 are substantially identical to the bracket part of the number 31 described above with respect to the preferred embodiment. In fact, the only difference between the brackets 33 in this alternative embodiment and those of the above described embodiment is that rather than the clip portion 39 leading into the angled leg portion 46, the portion 39 terminates in an outwardly curved end 58.

The tripod leg assembly generally designated by the reference numeral 60 in FIG. 5 is formed of three thin wall conduit leg members 61. Each of the leg members 61 has a tab end 63 which is formed by flattening and bending the end of the conduit. The tab extends at an oblique angle to the axis of the major portion of the leg member 61. Opposite the tab end 63 is a foot end which is provided with a cap 65. Approximately two-thirds of the way up from the capped foot end, each leg is provided with apertures 66 extending diametrically through both walls of the leg member.

A spider or Y-connector 67 has three pins 68, each of the pins is longer than the diameter of the leg member 61. As is best shown in FIGS. 6 and 7, one of each of the pins 68 extends through the apertures 66 in one of the leg members 61. The diameter of each of the pins is approximately 9/64 of an inch. A split ring 70 is formed from a piece of wire which is wrapped around to form a circle having a diameter which is somewhat greater than the diameter of a circle circumscribed above the periphery of the leg members 61 when they are stacked together with their axes parallel to form a triangle as is shown in FIG. 8. The wire is about one-fourth longer than the circumference of the finished ring such that the ends of the ring 70 are overlapped throughout approximately 90°. The overlapped portions are spaced from each other to form an axial gap 71 that is approximately 7/64 of an inch wide.

In order to initially assemble the tripod leg assembly 60 one of each of the leg members 61 is mounted on a pin 68 of the Y-connector 67 with the tab portion 63 extending outwardly as is shown in FIG. 6. Ring 70 is then slipped over the triangularly stacked leg 61 as is shown by the broken line ring in FIG. 8 and moved up the ends of the pins 68 which are protruding through the legs 61 such that one end of the gap on the ring is adjacent one of the protruding ends of the pins 68. The ring is then rotated approximately 45°, 165°, or 285° to entrap the protruding end of one of the pins 68 within the gap 71. Because the gap is smaller than the diameter of the pin 68 the ring is secured to the Y connector 67 by means of the spring tension exerted on the one pin 68 by the overlapping ends of the ring forming gap 71. The leg assembly 61 is now ready for use and it is only necessary to spread the lower portions of the legs 61 in order to form a self-standing tripod.

The bottom 50 of the bowl 21 is formed with three pairs of slots 75. The pairs of slots are equally spaced at 120° to each other around the bottom of the bowl. Although the slots 75 may be radially aligned with the horizontal slots 53 which are formed in the sides 51, it is preferred to space them 60° from the slots 53 so as not to unnecessarily weaken portions of the bowl 21. Each pair of slots 75 are formed transverse to the radius of the bottom of the bowl so as to form a retaining strip 76. The retaining strip may be depressed below the outer configuration of the bottom 50 of the bowl.

Alternatively, as is best shown in FIGS. 9 and 10, the portions of the bowl radially adjacent each one of the pairs of slots 75 may be pushed up into the bowl from the outer side of the bottom 51 to form recesses adjacent the retaining strip 76. In order to attach the tripod leg assembly 61 to the bowl 21 one of each of the tabs 63 is inserted through the slots 75 in the bottom 50 of the bowl as is illustrated in FIG. 9. FIG. 10 shows one of the legs 61 attached to the bowl 21. In order to attach the leg assembly 61 it is necessary to spread the tab portions 63 apart which in turn spreads apart the capped foot portions 65 thereby forming the leg assembly 61 into a self standing tripod.

Again it will be appreciated that insertion or removal of the tabs 63 into the pairs of slots 75 will dislodge any deposits of grease and carbonizatious material that may have accummulated during the use of the barbecue without requiring the user to exert any appreciable additional force.

While there have been shown and described two particular embodiments of the present invention, it will be apparent to those skilled in the art that various further changes and modifications may be made without departing from the invention in its broader aspects, and it is therefore, contemplated in the appended claims to cover all such changes and modifications as fall within the true spirit and scope of the present invention.

What is claimed as new and desired to be secured by Letters Patent of the United States is:

1. A portable barbecue comprising a bowl, a grid, legs for supporting said bowl, brackets for adjustably supporting said grid, said legs and said brackets being removably attachable to said bowl, said bowl having a bottom and substantially vertical sides upwardly extending from said bottom, a plurality of horizontally extending slots formed in said sides at peripherally spaced intervals, said brackets being formed from an elongated resilient strip of metal, each of said brackets having a notched portion containing a plurality of notches, a top notch adjacent one end of each of said strips, at least one additional notch below said top notch, each of said strips being insertable through one of said plurality of slots and each of said strips being formed so as to provide biasing means, said biasing means urging said notched portion of each of said strips into substantially vertical alignment with said sides and the other end of each of said strips into engagement with said bottom of said bowl.

2. A portable barbecue as defined in claim 1 wherein said bowl has a plurality of detents in said bottom, each of said detents being radially aligned with approximately the horizontal center of one of said slots, a projection on each of said strips adjacent said other end, said projection being urged by said biasing force into the detent aligned with the slot into which said strip is inserted to retain said strip attached to said bowl.

3. A portable barbecue as defined in claim 1 wherein one of each of said legs and one of each of said brackets comprise an integral member.

4. A portable barbecue as defined in claim 1 wherein each said notched portion is formed as a substantially vertical piece, a ledge portion projects laterally from a point below the bottom notch on said notch portion, said ledge portion projecting toward the outside of said bowl when said notched portion has been inserted into said slot and is in substantially vertical alignment with said sides, a short, substantially vertical, abutting portion formed at the outside end of said ledge portion, said vertical abutting portion extending below said ledge portion, and a curved portion beginning at the lower end of said vertical abutting portion, said curved portion extending outwardly and then downwardly and back inwardly to a point within the periphery of said bowl.

5. A portable barbecue as defined in claim 4 wherein said curved portion has a radius of curvature less than one-half of the distance between said slots and said bottom so as to provide said biasing force.

6. A portable barbecue as defined in claim 4 wherein said bowl has a plurality of detents in said bottom, each of said detents being radially aligned with approximately the horizontal center of one of said slots, a projection on each of said strips, said projection being formed on said curved portion inside the periphery of said bowl, said projection being urged by said biasing force into the detent aligned with the slot into which said strip is inserted to retain said strip attached to said bowl.

7. A portable barbecue as defined in claim 1 wherein said legs comprise three tubular leg members, each of said leg members having a foot end and a tab end, said leg members being joined together to form a tripod, means provided on said bottom for releasably attaching said tab ends to said bottom.

8. A portable barbecue as defined in claim 7 wherein each of said leg members has an aperture transverse to the longitudinal axis of the leg members, said aperture being located between said foot end and said tab end, a Y-connector having three projecting pins, one of each of said pins being insertable into one of each of said apertures, and a ring member having a diameter greater than the diameter of a circle circumscribed about the periphery of the leg members when they are stacked together with their axes to form a triangle.

9. A portable barbecue as defined in claim 8 wherein the ends of said ring overlap each other throughout a substantial portion of the circumference of the ring, an axial gap formed between the overlapped portions of said ring, said gap being smaller than any one of said pins.

* * * * *